United States Patent
Doedlinger et al.

(10) Patent No.: US 12,196,840 B2
(45) Date of Patent: Jan. 14, 2025

(54) UWB RANGING METHOD, DEVICE, AND SYSTEM

(71) Applicant: NXP B.V., Eindhoven (NL)

(72) Inventors: Dominik Doedlinger, Wildon (AT);
Michael Schober, Graz (AT);
Christian Eisendle, Graz (AT)

(73) Assignee: NXP B.V., Eindhoven (NL)

( * ) Notice: Subject to any disclaimer, the term of this patent is extended or adjusted under 35 U.S.C. 154(b) by 351 days.

(21) Appl. No.: 17/819,332

(22) Filed: Aug. 12, 2022

(65) Prior Publication Data

US 2023/0077848 A1 Mar. 16, 2023

(30) Foreign Application Priority Data

Sep. 10, 2021 (EP) .................................... 21196082

(51) Int. Cl.
*G01S 13/02* (2006.01)
*G01S 5/02* (2010.01)

(52) U.S. Cl.
CPC ........ *G01S 13/0209* (2013.01); *G01S 5/0252* (2013.01); *G01S 5/0284* (2013.01)

(58) Field of Classification Search
CPC ............... G01S 13/0209; G01S 5/0252; G01S 5/0284; G01S 5/0218; G01S 13/765; G01S 11/02

See application file for complete search history.

(56) References Cited

U.S. PATENT DOCUMENTS 10,768,280 B2  9/2020 Eber et al.
2007/0147236 A1  6/2007 Lee
(Continued)

FOREIGN PATENT DOCUMENTS

WO  2020249644 A1  12/2020

OTHER PUBLICATIONS

Großwindhager, B., "Enabling Runtime Adaptation of Physical Layer Settings for Dependable UWB Communications, 2018 IEEE 19th International Symposium on A World of Wireless, Mobile and Multimedia Networks" (WoWMoM), Jun. 12-15, 2018.

*Primary Examiner* — Umair Ahsan (57) ABSTRACT

There is described a method of determining a time of arrival of a signal at a UWB ranging device comprising a first antenna, the signal being transmitted by another UWB ranging device, the method comprising: determining a first channel impulse response based on at least a part of the signal received at the first antenna; determining a first time value as an earliest point in time at which the amplitude of the first channel impulse response exhibits a peak value; setting a candidate time value to the first time value; determining a first upper value as the amplitude of the first channel impulse response at a time value corresponding to the candidate time value plus a predetermined upper time value; determining a second upper value as the peak value plus a predetermined upper amplitude value; determining a first lower value as the amplitude of the first channel impulse response at a time value corresponding to the candidate time value minus a predetermined lower time value; determining a second lower value as the peak value minus a predetermined lower amplitude value; determining, as a first condition, whether the first upper value is larger than the second upper value; determining, as a second condition, whether the first lower value is smaller than the second lower value; and if at least one of the first condition and the second condition is not fulfilled, setting the time of arrival to the candidate time value. Furthermore, a UWB ranging device and a UWB system are described.

20 Claims, 5 Drawing Sheets

(56) References Cited

U.S. PATENT DOCUMENTS

| | | | |
|---|---|---|---|
| 2008/0267304 A1 | 10/2008 | Chong et al. | |
| 2011/0267234 A1* | 11/2011 | van Puijenbroek | H04W 64/00 342/387 |
| 2018/0255556 A1* | 9/2018 | Das | H04L 25/0224 |
| 2022/0239532 A1* | 7/2022 | Niewczas | H04W 12/03 |

* cited by examiner

UWB RANGING METHOD, DEVICE, AND SYSTEM

CROSS-REFERENCE TO RELATED APPLICATIONS

This application claims the priority under 35 U.S.C. § 119 of European Patent application no. 21196082.8, filed on 10 Sep. 2021, the contents of which are incorporated by reference herein.

TECHNICAL FIELD

The present disclosure relates to the field of UWB ranging technology. More specifically, the present disclosure relates to a method of determining a time of arrival of a signal at an UWB ranging device comprising a first antenna, the signal being transmitted by another UWB ranging device. Furthermore, the present disclosure relates to an UWB ranging device.

ART BACKGROUND

Ultra-Wide-Band (UWB) is an RF-communication technology used for accurate and replay/relay attack safe distance measurements. A key feature of the UWB-based distance estimate is that it guarantees a tight upper bound of the physical distance between the two devices that are participating in the ranging. In an environment with strong reflections, the shape of the pulses used for estimating the distance, can be distorted in such a way that the measured distance drops below the actual physical distance between the two devices. From a security point of view, such erroneous (too short) distance estimates are not allowed for most use cases, e.g., in conjunction with a car inside-outside detection There may thus be a need for a simple and efficient way of avoiding the above-mentioned problems.

SUMMARY

This need may be met by the subject matter according to the independent claims. Advantageous embodiments of the present disclosure are set forth in the dependent claims.

According to a first aspect, there is provided method of determining a time of arrival of a signal at an UWB ranging device comprising a first antenna, the signal being transmitted by another UWB ranging device. The method comprises determining a first channel impulse response based on at least a part of the signal received at the first antenna; determining a first time value as an earliest point in time at which the amplitude of the first channel impulse response exhibits a peak value; setting a candidate time value to the first time value; determining a first upper value as the amplitude of the first channel impulse response at a time value corresponding to the candidate time value plus a predetermined upper time value; determining a second upper value as the peak value plus a predetermined upper amplitude value; determining a first lower value as the amplitude of the first channel impulse response at a time value corresponding to the candidate time value minus a predetermined lower time value; determining a second lower value as the peak value minus a predetermined lower amplitude value; determining, as a first condition, whether the first upper value is larger than the second upper value; determining, as a second condition, whether the first lower value is smaller than the second lower value; and if at least one of the first condition and the second condition is not fulfilled, setting the time of arrival to the candidate time value.

This aspect is based on the idea that a candidate value for the time of arrival is determined based on a first peak in the channel impulse response and, if two conditions are not fulfilled, used as the actual time of arrival. The two (first and second) conditions are applied in order to determine whether the first peak in the channel impulse response is caused by (destructive) interference from a reflected signal. More specifically, the conditions are designed to detect when the first peak is not the "true" first peak corresponding to the so-called "first path", i.e., the direct path between the UWB ranging devices. By ruling out such erroneous first peaks, the reliability and precision of the ranging is significantly improved.

According to an embodiment, the method further comprises: if both the first condition and the second condition are fulfilled, determining a subsequent point in time at which the amplitude of the first channel impulse response exhibits another peak value, and setting the time of arrival to the subsequent point in time.

In other words, if it is determined that both conditions are fulfilled such that the determined first peak is not the true first peak, the next peak is determined and the time of arrival is set to the corresponding subsequent point in time.

According to a further embodiment, the UWB ranging device comprises a first antenna and a second antenna, the method further comprises: determining a second channel impulse response based on at least a part of the signal received at the second antenna; determining a second time value as an earliest point in time at which the amplitude of the second channel impulse response exhibits a peak value; and setting the candidate time value to the smallest of the first time value and the second time value, wherein determining each of the first upper value, the second upper value, the first lower value, and the second lower value is based on the one of the first channel impulse response and the second channel impulse response that corresponds to the candidate time value.

In this embodiment, first and a second spatially separated antennas are used to obtain corresponding first and second channel impulse responses and first and second time values corresponding to the earliest peak in each of the first and second channel impulse response. The candidate time value is set to the smallest (i.e., earliest) of the first and second time values, and each of the first upper value, the second upper value, the first lower value, and the second lower value is determined on the basis of that one of the first and second channel impulse responses that has the earliest peak, i.e., the one that has a peak at the candidate time value.

According to a further embodiment, the method further comprises comparing an absolute difference between the first time value and the second time value with a predetermined threshold value; and if the absolute difference does not exceed the predetermined threshold value, setting the time of arrival to the smallest of the first time value and the second time value.

In other words, as long as the absolute difference between the first and second time values does not exceed the predetermined threshold value, the time of arrival is set to the smallest (earliest) of the first and second time values. When the difference is small enough, it can be assumed that neither of the received channel impulse responses exhibit a destructive interference from a reflected signal. A typical value for the predetermined threshold value is around 1 ns.

According to a further embodiment, the UWB ranging device comprises a receiver and a switch, the switch being configured to selectively connect the receiver to one of the first antenna and the second antenna, the method further comprises: operating the switch to connect the receiver to the first antenna; receiving a first part of the signal at the receiver via the first antenna; operating the switch to connect the receiver to the second antenna; and receiving a second part of the signal at the receiver via the second antenna; wherein the first channel impulse response is determined based on the first part of the signal received at the receiver, and wherein the second channel impulse response is determined based on the second part of the signal received at the receiver.

In other words, the switch is operated to alternately connect the receiver to each of the two antennas such that the first part of the signal is received via the first antenna while the second part of the signal is received via the second antenna. The first channel impulse response is determined from the first part of the signal and the second channel impulse response is determined from the second part of the signal. Thus, by switching between the two antennas, the same receiver can be used to obtain both the first and second channel impulse response from one signal transmission (so-called single shot).

According to a further embodiment, the signal comprises a frame with an STS (Scrambled Timestamp Sequence), wherein the first part of the signal comprises a preamble and an SFD (Start Frame Delimiter), and wherein the second part of the signal comprises the STS.

According to a further embodiment, the UWB ranging device comprises a first receiver coupled to the first antenna and a second receiver coupled to the second antenna, the method further comprises: receiving the signal at the first receiver via the first antenna; and receiving the signal at the second receiver via the second antenna, wherein the first channel impulse response is determined based on the signal received at the first receiver, and wherein the second channel impulse response is determined based on the signal received at the second receiver.

In this embodiment, no switch is needed and instead two receivers (one receiver per antenna) are used to obtain the first and second channel impulse response.

According to a further embodiment, the UWB ranging device further comprises a third antenna, the method further comprises: determining a third channel impulse response based on at least a part of the signal received at the third antenna; determining a third time value as an earliest point in time at which the amplitude of the third channel impulse response exhibits a peak value; and setting the candidate time value to the smallest of the first time value, the second time value, and the third time value, wherein determining each of the first upper value, the second upper value, the first lower value, and the second lower value is based on the one of the first channel impulse response, second channel impulse, and third channel impulse response that corresponds to the candidate time value.

In other words, a further (third) antenna is added to obtain a further (third) channel impulse response. Like in the preceding embodiments, the earliest peak is found in each of the three channel impulse responses and the candidate time value is set to the smallest (earliest) one of the corresponding (first, second or third) time values.

According to a further embodiment, the method further comprises: comparing an absolute difference between the two smallest of the first time value, the second time value, and the third time value with a predetermined threshold value; and if the absolute difference does not exceed the predetermined threshold value, setting the time of arrival to the smallest of the first time value, the second time value and the third time value.

If the difference between the two earliest time values is not above the predetermined threshold value, it is assumed that neither signal is negatively influenced by a reflection causing destructive interference.

According to a further embodiment, the UWB ranging device comprises a receiver and a switch, the switch being configured to selectively connect the receiver to one of the first antenna, the second antenna, and the third antenna, the method further comprises: operating the switch to connect the receiver to the first antenna; receiving a first part of the signal at the receiver via the first antenna; operating the switch to connect the receiver to the second antenna; receiving a second part of the signal at the receiver via the second antenna; operating the switch to connect the receiver to the third antenna; receiving a third part of the signal at the receiver via the third antenna; wherein the first channel impulse response is determined based on the first part of the signal received at the receiver, wherein the second channel impulse response is determined based on the second part of the signal received at the receiver, and wherein the third channel impulse response is determined based on the third part of the signal received at the receiver.

In other words, a switch is operated to alternately connect the receiver to one of the three antennas at a time and receiving corresponding first, second and third signal parts via the corresponding antenna.

According to a further embodiment, the signal comprises a frame with a segmented STS (Scrambled Timestamp Sequence), wherein the first part of the signal comprises a preamble and an SFD (Start Frame Delimiter), wherein the second part of the signal comprises a first STS segment, and wherein the third part of the signal comprises a second STS segment.

According to a further embodiment, the predetermined upper time value may be around 3 ns. According to a further embodiment, the predetermined upper amplitude value may be around 6 dB. According to a further embodiment, the predetermined lower time value may be around 0.6 ns. According to a further embodiment, the predetermined lower amplitude value may be around 3 dB.

The above-described embodiments utilize one, two or three antennas. The skilled person will appreciate that even more, such as four, five, six, or more antennas can be used in accordance with the same principles.

According to a second aspect, there is provided an UWB ranging device, comprising: a first antenna configured to receive a signal transmitted by another UWB ranging device; and a processing unit configured to: determine a first channel impulse response based on at least a part of the signal received at the first antenna; determine a first time value as an earliest point in time at which the amplitude of the first channel impulse response exhibits a peak value; set a candidate time value to the first time value; determine a first upper value as the amplitude of the first channel impulse response at a time value corresponding to the candidate time value plus a predetermined upper time value; determine a second upper value as the peak value plus a predetermined upper amplitude value; determine a first lower value as the amplitude of the first channel impulse response at a time value corresponding to the candidate time value minus a predetermined lower time value; determine a second lower value as the peak value minus a predetermined lower amplitude value; determine, as a first condition, whether the first upper value is larger than the second upper value;

determine, as a second condition, whether the first lower value is smaller than the second lower value; and if at least one of the first condition and the second condition is not fulfilled, set the time of arrival to the candidate time value.

This aspect is essentially based on the same idea as the first aspect discussed above and provides a device with functionality to perform the method according to the first aspect. Thus, a candidate value for the time of arrival is determined based on a first peak in the channel impulse response and, if two conditions are not fulfilled, used as the actual time of arrival. The two (first and second) conditions are applied in order to determine whether the first peak in the channel impulse response is caused by (destructive) interference from a reflected signal. More specifically, the conditions are designed to detect when the first peak is not the "true" first peak corresponding to the so-called "first path", i.e., the direct path between the UWB ranging device and another UWB ranging device. By ruling out such erroneous first peaks, the reliability and precision of the UWB ranging device is significantly improved.

According to a further embodiment, the processing unit is further configured to: if both the first condition and the second condition are fulfilled, determine a subsequent point in time at which the amplitude of the first channel impulse response exhibits another peak value, and set the time of arrival to the subsequent point in time.

In other words, if it is determined that both conditions are fulfilled such that the determined first peak is not the true first peak, the processing unit determines the next peak and sets the time of arrival to the corresponding subsequent point in time.

According to a further embodiment, the device further comprises a second antenna configured to receive the signal transmitted by the other UWB ranging device, wherein the processing unit is further configured to: determine a second channel impulse response based on at least a part of the signal received at the second antenna; determine a second time value as an earliest point in time at which the amplitude of the second channel impulse response exhibits a peak value; and set the candidate time value to the smallest of the first time value and the second time value, wherein determining each of the first upper value, the second upper value, the first lower value, and the second lower value is based on the one of the first channel impulse response and the second channel impulse response that corresponds to the candidate time value.

In this embodiment, the ranging device comprises first and a second spatially separated antennas and uses these to obtain corresponding first and second channel impulse responses and first and second time values corresponding to the earliest peak in each of the first and second channel impulse response. The processing unit sets the candidate time value to the smallest (i.e., earliest) of the first and second time values, and determines each of the first upper value, the second upper value, the first lower value, and the second lower value on the basis of that one of the first and second channel impulse responses that has the earliest peak, i.e., the one that has a peak at the candidate time value.

According to a further embodiment, the processing unit is further configured to: compare an absolute difference between the first time value and the second time value with a predetermined threshold value; and if the absolute difference does not exceed the predetermined threshold value, set the time of arrival to the smallest of the first time value and the second time value.

In other words, as long as the absolute difference between the first and second time values does not exceed the predetermined threshold value, the processing unit sets the time of arrival to the smallest (earliest) of the first and second time values. When the difference is small enough, it can be assumed that neither of the received channel impulse responses exhibit a destructive interference from a reflected signal. A typical value for the predetermined threshold value is around 1 ns.

According to a further embodiment, the device further comprises: a receiver; and a switch configured to selectively connect the receiver to one of the first antenna and the second antenna, wherein the processing unit is further configured to: operate the switch to connect the receiver to the first antenna; receive a first part of the signal at the receiver via the first antenna; operate the switch to connect the receiver to the second antenna; and receive a second part of the signal at the receiver via the second antenna; wherein the first channel impulse response is determined based on the first part of the signal received at the receiver, and wherein the second channel impulse response is determined based on the second part of the signal received at the receiver.

In other words, the processing unit operates the switch to alternately connect the receiver to each of the two antennas such that the first part of the signal is received via the first antenna while the second part of the signal is received via the second antenna. The processing unit then determines the first channel impulse response from the first part of the signal and determines the second channel impulse response from the second part of the signal. Thus, by switching between the two antennas, the same receiver can be used to obtain both the first and second channel impulse response from one signal transmission (so-called single shot).

According to a further embodiment, the signal comprises a frame with an STS (Scrambled Timestamp Sequence), wherein the first part of the signal comprises a preamble and an SFD (Start Frame Delimiter), and wherein the second part of the signal comprises the STS.

According to a further embodiment, the device further comprises: a first receiver coupled to the first antenna and configured to receive the signal via the first antenna; and a second receiver coupled to the second antenna and configured to receive the signal via the second antenna, wherein the processing unit is configured to: determine the first channel impulse response based on the signal received at the first receiver, and determine the second channel impulse response based on the signal received at the second receiver.

In this embodiment, no switch is needed and instead two receivers (one receiver per antenna) are used to obtain the first and second channel impulse response.

According to a further embodiment, the device further comprises a third antenna, wherein the processing unit is further configured to: determine a third channel impulse response based on at least a part of the signal received at the third antenna; determine a third time value as an earliest point in time at which the amplitude of the third channel impulse response exhibits a peak value; and set the candidate time value to the smallest of the first time value, the second time value, and the third time value, wherein determining each of the first upper value, the second upper value, the first lower value, and the second lower value is based on the one of the first channel impulse response, second channel impulse, and third channel impulse response that corresponds to the candidate time value.

In other words, a further (third) antenna is added to obtain a further (third) channel impulse response. Like in the preceding embodiments, the processing unit finds the earliest peak in each of the three channel impulse responses and sets the candidate time value to the smallest (earliest) one of the corresponding (first, second or third) time values.

According to a further embodiment, the processing unit is further configured to: compare an absolute difference between the two smallest of the first time value, the second time value, and the third time value with a predetermined threshold value; and if the absolute difference does not exceed the predetermined threshold value, set the time of arrival to the smallest of the first time value, the second time value and the third time value.

If the difference between the two earliest time values is not above the predetermined threshold value, it is assumed that neither signal is negatively influenced by a reflection causing destructive interference.

According to a further embodiment, the device further comprises: a receiver; and a switch configured to selectively connect the receiver to one of the first antenna, the second antenna, and the third antenna, wherein the processing unit is further configured to: operate the switch to connect the receiver to the first antenna; receive a first part of the signal at the receiver via the first antenna; operate the switch to connect the receiver to the second antenna; receive a second part of the signal at the receiver via the second antenna; operate the switch to connect the receiver to the third antenna; receive a third part of the signal at the receiver via the third antenna; wherein the first channel impulse response is determined based on the first part of the signal received at the receiver, wherein the second channel impulse response is determined based on the second part of the signal received at the receiver, and wherein the third channel impulse response is determined based on the third part of the signal received at the receiver.

In other words, the processing unit operates a switch to alternately connect the receiver to one of the three antennas at a time and in order to receive corresponding first, second and third signal parts via the corresponding antenna.

According to a further embodiment, the signal comprises a frame with a segmented STS (Scrambled Timestamp Sequence), wherein the first part of the signal comprises a preamble and an SFD (Start Frame Delimiter), wherein the second part of the signal comprises a first STS segment, and wherein the third part of the signal comprises a second STS segment.

According to a further embodiment, the predetermined upper time value may be around 3 ns. According to a further embodiment, the predetermined upper amplitude value may be around 6 dB. According to a further embodiment, the predetermined lower time value may be around 0.6 ns. According to a further embodiment, the predetermined lower amplitude value may be around 3 dB.

The above-described embodiments utilize one, two or three antennas. The skilled person will appreciate that even more, such as four, five, six, or more antennas can be used in accordance with the same principles.

According to a third aspect, there is provided an UWB ranging system, the system comprising: a first UWB ranging device according to the second aspect or any embodiment thereof; and a second UWB ranging device configured to send a signal to the first UWB ranging device.

The third aspect utilizes the idea behind the first and second aspects in a system comprising two UWB ranging devices, at least one of these being an UWB ranging device in accordance with the second aspect.

It should be noted that exemplary embodiments have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular a combination of features of the method type claims and features of the apparatus type claims, is also disclosed with this document.

The aspects defined above and further aspects of the present disclosure will be apparent from the examples of embodiment to be described hereinafter and are explained with reference to the examples of embodiment. Aspects of the present disclosure will be described in more detail hereinafter with reference to examples of embodiment to which the present disclosure is, however, not limited.

DETAILED DESCRIPTION

The illustration in the drawing is schematic. It is noted that in different figures, similar or identical elements are provided with the same reference signs or with reference signs, which differ only within the first digit.

Impulse radio (IR) Ultrawideband (UWB) is a technology used for time of flight (TOF) ranging. Typically, a method called two way ranging (TWR) is implemented on the UWB devices for measuring the distance. An UWB receiver calculates an estimation of the real physical RF-channel to detect the first incoming signal. This estimation is called channel impulse response (CIR) and the first signal on the RF-channel is called first path. Due to the properties of the UWB physical layer (PHY), the CIR estimate indicates how a single UWB pulse sent from the transmitter (TX) is manipulated by the RF-channel when it arrives on the receiver (RX) end with all its reflections.

It is now up to a time of arrival (TOA) algorithm to calculate the arrival time of the first pulse from the CIR to estimate the real physical distance. Although, by definition UWB is not prone to fading because the pulses are very short in time (in the range of 2 ns), there is the possibility that a reflected pulse arrives at the receiver during those 2 ns. This is in general not a big problem for the TOA calculation as long as the interference caused by the RF-channel is not destructive on the first path. Such a destructive interference could lead to too short distance estimates, which can be up to 90 cm less than the real physical distance. A too short distance estimation could be a huge security problem for applications like an automotive keyless Go system where the anchors in the car perform an inside-outside detection with the UWB key fob in order to detect if the person is allowed to press the start button. The basics and properties for such a destructive interference are explained below in more detail.

A reliable TOA algorithm searches now the peak of the first pulse to get an estimation of the real time of arrival. It is important to search for the peak and not the leading edge, because a leading-edge detection based on a threshold would lead to a large distance estimation error dependent on the amplitude of the pulse. Not only that, also simple distance decreasing attacks based on an amplification of the RF signal are possible. In destructive interference scenarios, where the reflected pulse is delayed by multiples of half the carrier period, the receiver pulse shape is deformed and the first peak may not occur at the correct time.

Destructive interference means that the RF-signal of the reflection is shifted in phase with exactly 180° so that parts of the total RF signal are canceled out. If a signal is reflected, the phase shifts by 180°. If it is reflected a second time, we have a phase shift of 360° respectively. From these considerations it follows that for Channel 9 (8 GHz), the following possible destructive delays for the reflection can be calculated:

$$\frac{1}{fc} \cdot \frac{1}{2} = 63 \text{ ps}$$

$$\frac{1}{fc} \cdot \frac{2}{2} = 125 \text{ ps}$$

$$\frac{1}{fc} \cdot \frac{3}{2} = 188 \text{ ps}$$

...

Figure 1:
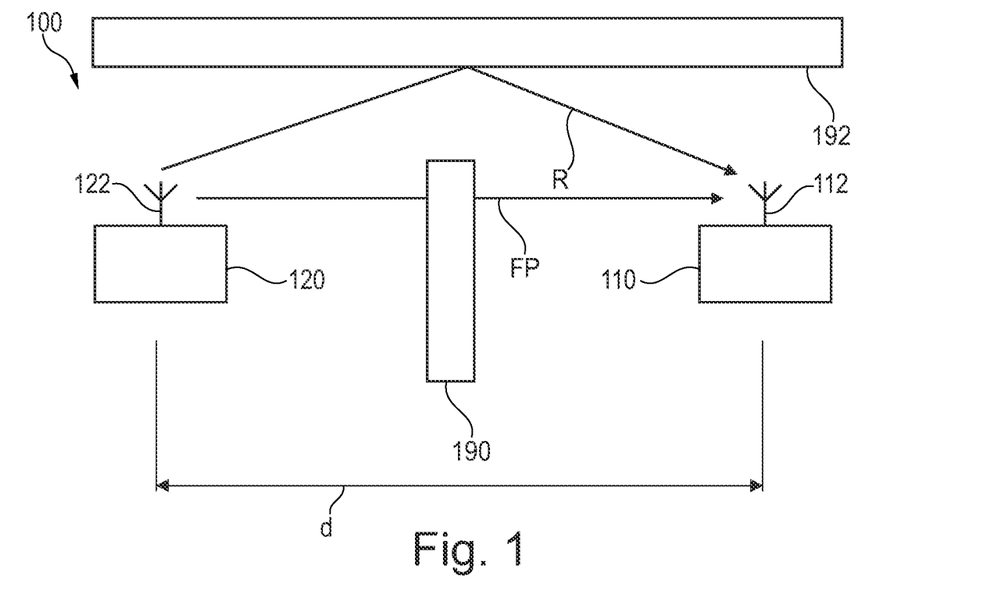
FIG. 1 shows an UWB ranging system with UWB ranging devices in accordance with an exemplary embodiment.

If the reflected pulse shows following additional properties, we will see a TOA estimation drop scenario and respectively a distance drop in the measurement results:
- Reflected pulse power must be in the range of 0 to 12 dB higher in power then the first pulse
- Allowed arrival time of reflection is in range 0 to 10 carrier cycles delay compared to first path. (Later arrival time doesn't show significant distance drop anymore)
- Window around the half period delay time where destructive interference happens is +/−5 ps FIG. 1 shows an UWB ranging system 100 with two UWB ranging devices 110, 120 in accordance with an exemplary embodiment. More specifically, the UWB ranging device 110 comprises an antenna 112 and acts as a receiver while the UWB ranging device 120 which comprises an antenna 122 acts as a transmitter. The purpose is to determine the distance d between the transmitter 120 and receiver 110. An obstacle 190 blocks the direct line of sight between transmitter 120 and receiver 110, and thus causes a certain attenuation of the signal that travels along the so-called first path FP from the transmitter 120 to the receiver 110. A wall 192 causes a reflection along the path R between the transmitter 120 and the receiver 110. Depending on the additional length of the reflection path R in comparison to the first path FP as well as on the amount of attenuation caused by the obstacle 190, the reflected signal R may cause a significant destructive interference as mentioned above and illustrated in FIGS. 2 and 3.

Figure 2:
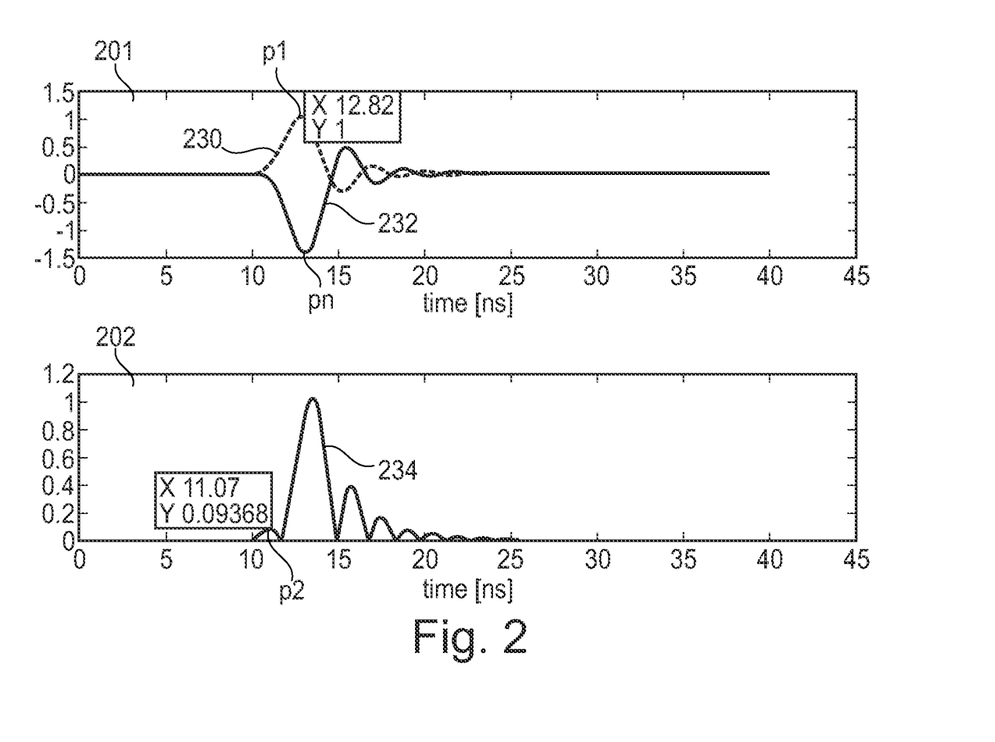
FIG. 2 shows signal plots in a situation with destructive interference from a reflected signal.

FIG. 2 shows signal plots in a situation with destructive interference from a reflected signal. More specifically, FIG. 2 shows a plot 201 of the separated signals 230, 232 (in baseband) received at the receiver 110 via the first path FP and the reflection path R, respectively. Furthermore, FIG. 2 shows a plot 202 of the total signal 234 received at the receiver 110 (absolute IQ value after demodulation, corresponding to an oversampled representation of the channel impulse response CIR). The delay between the first path FP and the reflected path R is 0.2504 ns and the power difference (due to the attenuation caused by obstacle 190) is 3 dB. As can be seen, the first path signal 230 has a first (positive) peak p1 at t=12.82 ns almost exactly where the reflected signal 232 has a negative peak pn. This causes a very strong destructive interference which results in an earlier first peak p2 in the total signal 234 at t=11.07 ns. In other words, the first peak p2 in the resulting signal 234 is about 1.7 ns too early, which corresponds to a significant distance error of 51 cm.

Figure 3:
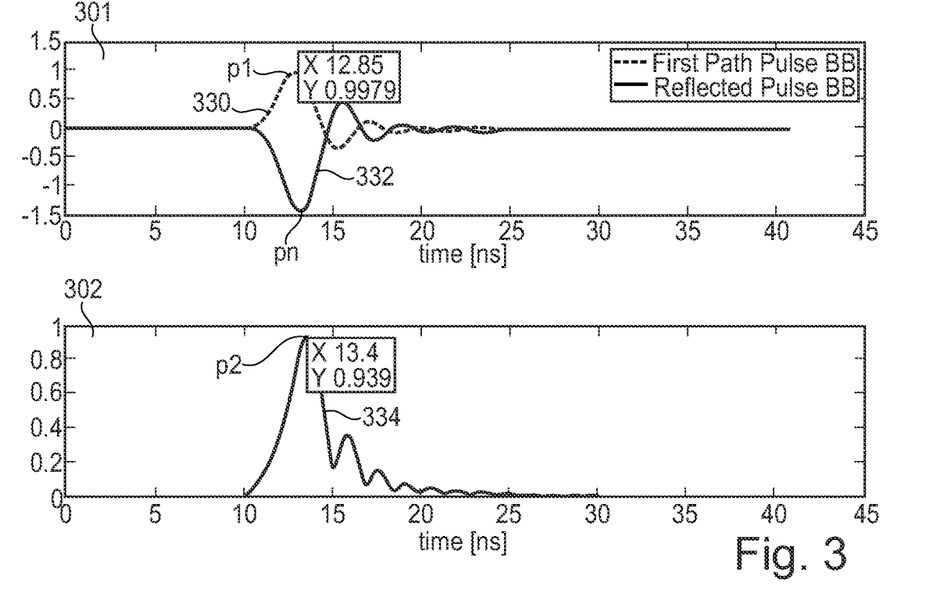
FIG. 3 shows signal plots in a situation without destructive interference from a reflected signal.

FIG. 3 shows signal plots in a situation without destructive interference from a reflected signal. More specifically, FIG. 3 shows a plot 301 of the separated signals 330, 332 (in baseband) received at the receiver 110 via the first path FP and the reflection path R, respectively. Furthermore, FIG. 3 shows a plot 302 of the total signal 334 received at the receiver 110 (absolute IQ value after demodulation, corresponding to an oversampled representation of the channel impulse response CIR). In this case, the delay between the first path FP and the reflected path R is 0.2604 ns (2 additional carrier cycles in comparison to the scenario shown in FIG. 2). Like in FIG. 2, the power difference (due to the attenuation caused by obstacle 190) is 3 dB. As can be seen, the first path signal 330 has a first (positive) peak p1 at t=12.85 ns while the reflected signal 332 has a negative peak pn a bit later. This difference is enough to avoid that the destructive interference results in an earlier first peak p2 in the total signal 234. Instead, p2 occurs at t=13.4 ns, i.e., a bit later than p1, such that a slightly higher distance will be determined. However, this is not a problem, because only shorter distance estimates are security relevant.

Summarized, there is only a small window—with some other channel properties—where such a destructive interference from a reflected pulse would lead to a problematic distance drop. Real world measurements in a typical environment like an office show a probability of around ¹⁄₁₀₀₀ to see a distance drop of 30 to 60 cm on a physical UWB device, while the probability strongly depends on the reflective environment. For further explanations, the probability is kept generic and denoted p. Matlab simulations have shown a worst-case distance drop of 90 cm.

The biggest problem for a detection based on the pulse shape is that a real-world channel with e.g., a 2 ns delayed reflection could appear in the RX CIR with the exact same IQ data as a destructive interference scenario.

The present disclosure proposes algorithms capable of detecting a destructive interference in a simple and efficient manner. The algorithms can be implemented in any processing unit or signal processing unit in a typical UWB ranging device.

Figure 4:
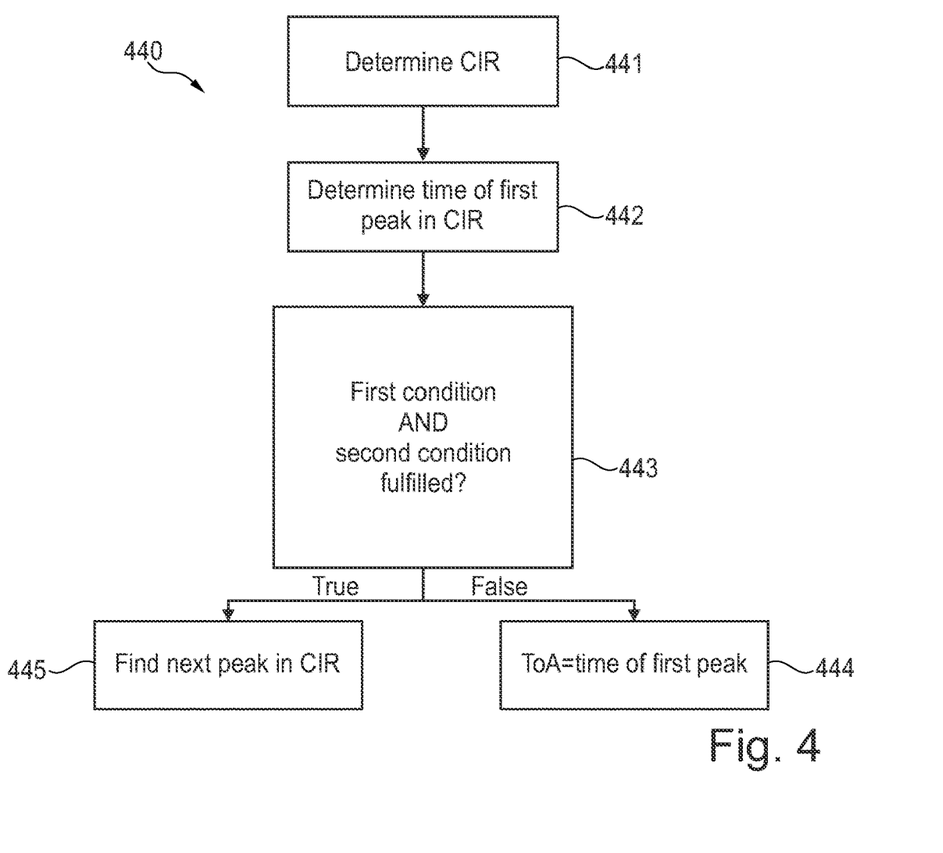
FIG. 4 shows a flowchart of a method according to an exemplary embodiment.

FIG. 4 shows a flowchart 440 of a method of determining a time of arrival of a signal at an UWB ranging device 110 according to an exemplary embodiment. The UWB ranging device 110 comprises a (first) antenna 112 and receives the ranging signal from another UWB ranging device 120 as shown in FIG. 1 and discussed above.

The method begins at 441 by determining a first channel impulse response based on at least a part of the signal received at the first antenna 112. The method 440 continues at 442 by determining a first time value as an earliest point in time at which the amplitude of the first channel impulse response exhibits a peak value. In other words, the time at which the first (earliest) peak occurs in the first channel impulse response is determined. Furthermore, in order to allow further analysis, a candidate time value is set to the first time value.

Then, at 443, it is checked whether a first condition and a second condition are both fulfilled. This involves the following preparatory steps: (a) determining a first upper value as the amplitude of the first channel impulse response at a time value corresponding to the candidate time value plus a predetermined upper time value; (b) determining a second upper value as the peak value plus a predetermined upper amplitude value; (c) determining a first lower value as the amplitude of the first channel impulse response at a time value corresponding to the candidate time value minus a predetermined lower time value; and (d) determining a second lower value as the peak value minus a predetermined lower amplitude value. Typical values for these determinations are: predetermined upper time value=3 ns; predetermined upper amplitude value=6 dB; predetermined lower time value=0.6 ns; and predetermined lower amplitude value=3 dB. Having these four values available, it is determined, as the first condition, whether the first upper value is larger than the second upper value, and, as the second condition, whether the first lower value is smaller than the second lower value.

Then, at 444, if at least one of the first condition and the second condition is not fulfilled, i.e., if first condition AND second condition is logically false, the time of arrival is set to the candidate time value. That is, as long as both conditions are not met, the candidate time (i.e., the time of the peak in the first channel impulse response) is used as the time of arrival (ToA).

Otherwise, at 445, if first condition AND second condition is logically true, the next peak in the channel impulse response is found and the corresponding time is used as the time of arrival (ToA).

Figure 5:
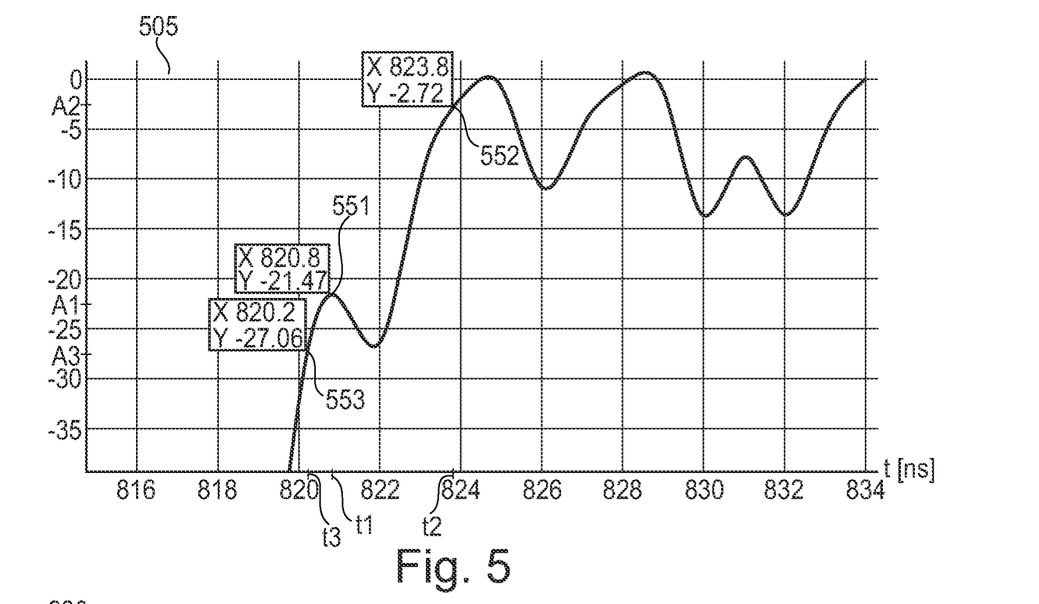
FIG. 5 shows a plot of a channel impulse response evaluated in accordance with the method shown in FIG. 4.

FIG. 5 shows a plot 505 of a channel impulse response evaluated in accordance with the method shown in FIG. 4 and discussed above. The first peak in the channel impulse response is indicated as 551, having a value A1 of −21.47 dB at t1=820.8 ns. The first upper value A2 is found as the amplitude of the channel impulse response at t2=t1+3 ns=823.8 ns. As indicated by 552, the first upper value A2 equals −2.72 dB. The second upper value is found as A1+6 dB=−15.47 dB. Hence, the first upper value A2 exceeds the second upper value, and the first condition is accordingly fulfilled. The first lower value A3 is found as the amplitude of the channel impulse response at t3=t1−0.6 ns=820.2 ns. As indicated by 553, the first lower value A3 equals −27.06 dB. The second lower value is found as A1−3 dB=−24.47 dB. Hence, the first lower value A3 is less than the second lower value, and the second condition is accordingly fulfilled. Since both the first and second conditions are fulfilled in this case, the method 440 will jump from 443 to 445, i.e., discard the candidate time value and find the next peak in the channel impulse response.

Figure 6:
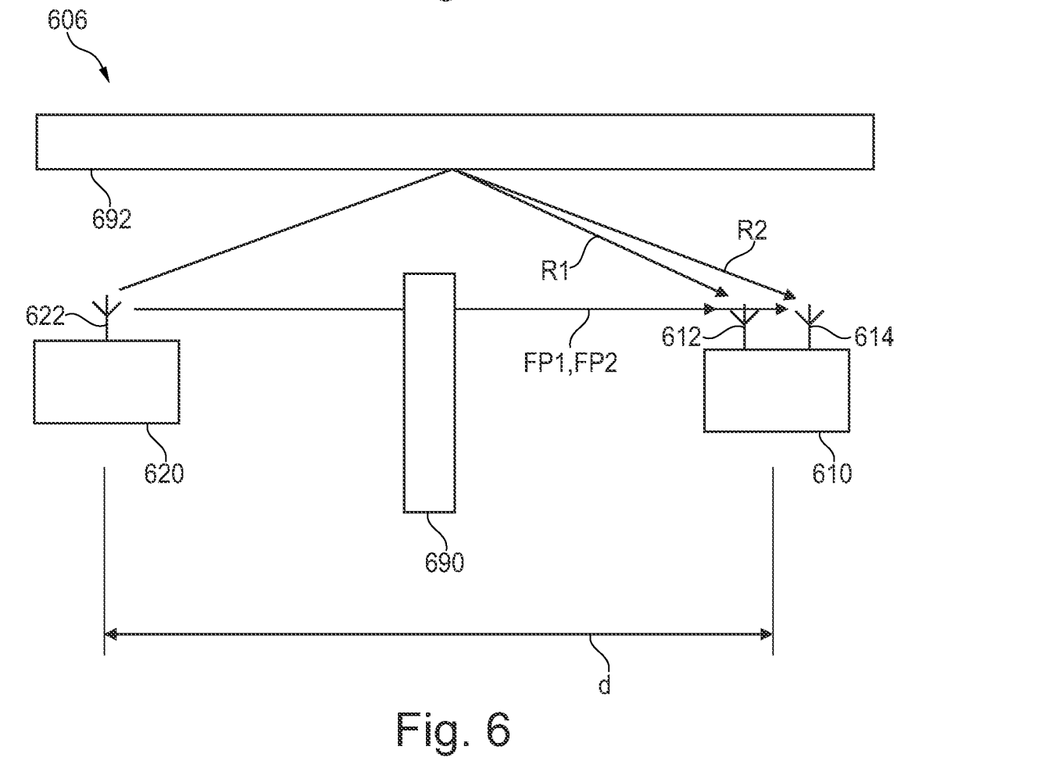
FIG. 6 shows an UWB ranging system with UWB ranging devices in accordance with another exemplary embodiment.

FIG. 6 shows an UWB ranging system 606 with two UWB ranging devices 610, 620 in accordance with another exemplary embodiment. More specifically, the UWB ranging device 610 comprises two antennas, first antenna 612 and second antenna 614, and acts as a receiver while the UWB ranging device 620 which comprises at least one antenna 622 acts as a transmitter. Like in FIG. 1, the purpose is to determine the distance d between the transmitter 620 and receiver 610. An obstacle 690 blocks the direct line of sight between transmitter 620 and receiver 610, and thus causes a certain attenuation of the signal that travels along the so-called first paths FP1, FP2 from the transmitter 120 to each of the antennas 612, 614 of the receiver 610. A wall 692 causes reflections along the paths R1, R2 between the transmitter 620 and each of the antennas 612, 614 of the receiver 610. Depending on the additional lengths of the reflection paths R1, R2 in comparison to the first paths FP1, FP2 as well as on the amount of attenuation caused by the obstacle 190, the reflected signals R1, R2 may cause significant destructive interferences as discussed above.

Figure 7:
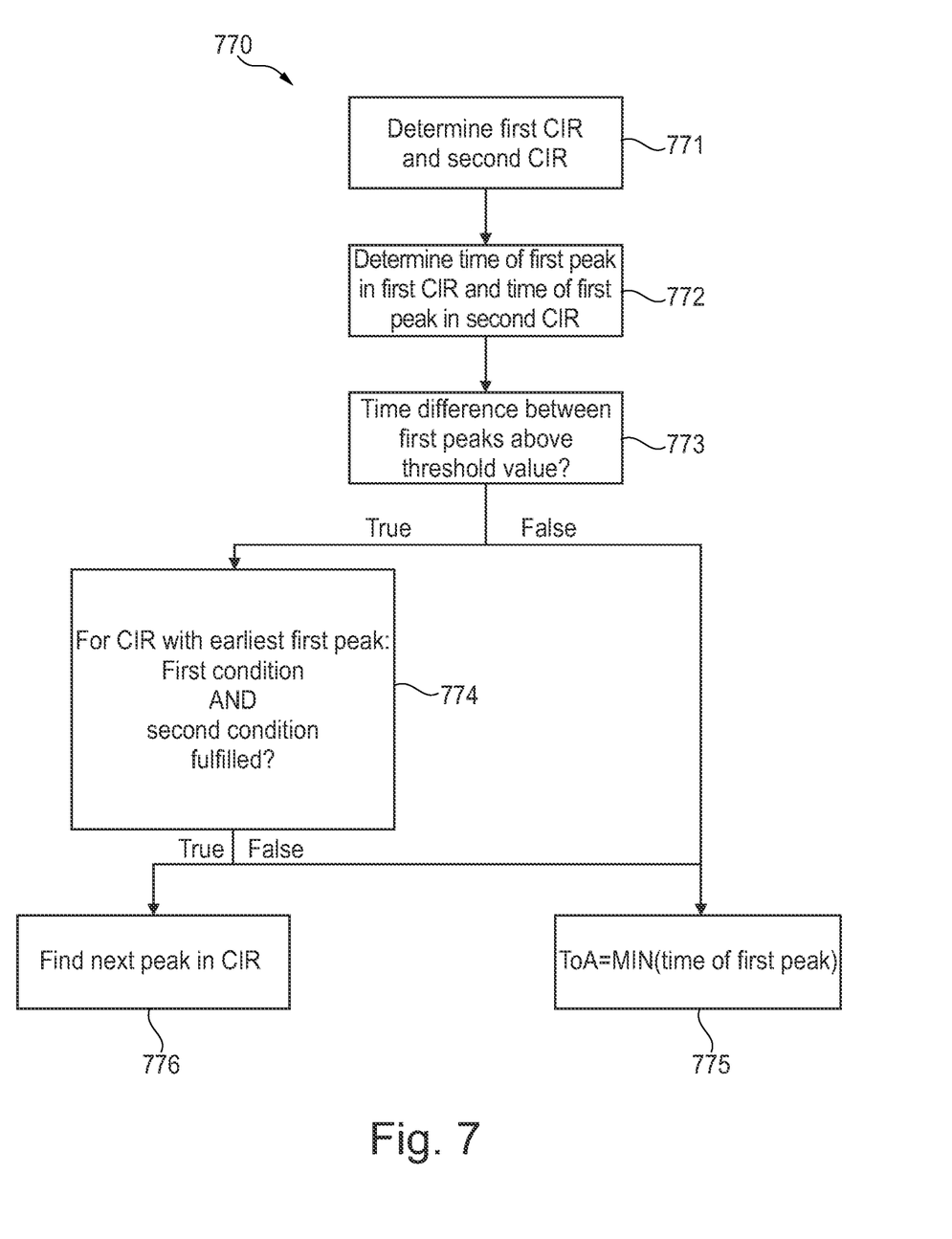
FIG. 7 shows a flowchart of a method according to another exemplary embodiment.

FIG. 7 shows a flowchart 770 of a method of determining a time of arrival of a signal at the UWB ranging device 610 according to an exemplary embodiment. The UWB ranging device 610 comprises a first antenna 612 and a second antenna 614, and receives the ranging signal from the other UWB ranging device 620 via each of the antennas 612, 614 as shown in FIG. 6 and discussed above. The signal reception via the two antennas 612, 614 may involve operating a switch to alternatingly connect the antennas to a single receiver. Alternatively, each antenna 612, 614 is coupled to its own dedicated receiver.

The method begins at 771 by determining a first channel impulse response based on at least a part of the signal received at the first antenna 612 and a second channel impulse response based on at least a part of the signal received at the second antenna 614.

The method 770 continues at 772 by determining a first time value as an earliest point in time at which the amplitude of the first channel impulse response exhibits a peak value, and determining a second time value as an earliest point in time at which the amplitude of the second channel impulse response exhibits a peak value. In other words, the times at which the first (earliest) peak occurs in each of the first channel impulse and the second channel impulse response are determined.

At 773, the absolute difference between the first and second time values is compared with a predetermined threshold value. A typical value for the predetermined threshold value is 1 ns. If the comparison reveals that the absolute difference does not exceed the predetermined threshold value, the method continues to 775 and sets the time of arrival to the smallest of the first and second time values, i.e., ToA=MIN(first time value, second time value). In other words, if the first and second time values are close to each other, it is assumed that no destructive interference has a significant influence on the ranging result and the smallest of the two time values is used as the time of arrival.

Otherwise, if the comparison at 773 reveals that the absolute difference exceeds the predetermined threshold value, the method 770 continues to 774 and sets a candidate time value to the smallest of the first and second time values in order to allow further analysis. Then, still at 774, it is checked whether a first condition and a second condition are both fulfilled for the one of the first and second impulse responses that corresponds to the candidate time value. This particular channel impulse response is referred to as "the channel impulse response" in the following. Then, the following preparatory steps are applied to the channel impulse response: (a) determining a first upper value as the amplitude of the channel impulse response at a time value corresponding to the candidate time value plus a predetermined upper time value; (b) determining a second upper value as the peak value plus a predetermined upper amplitude value; (c) determining a first lower value as the amplitude of the channel impulse response at a time value corresponding to the candidate time value minus a predetermined lower time value; and (d) determining a second lower value as the peak value minus a predetermined lower amplitude value. Typical values for these determinations are: predetermined upper time value=3 ns; predetermined upper amplitude value=6 dB; predetermined lower time value=0.6 ns; and predetermined lower amplitude value=3 dB. Having these four values available, it is determined, as the first condition, whether the first upper value is larger than the second upper value, and, as the second condition, whether the first lower value is smaller than the second lower value.

Then, at 775, if at least one of the first condition and the second condition is not fulfilled, i.e., if first condition AND second condition is logically false, the time of arrival is set to the candidate time value. That is, as long as both conditions are not met, the candidate time value (i.e., the time corresponding to the earliest of the first peaks in the first and second channel impulse responses) is used as the time of arrival (ToA), i.e., ToA=MIN(first time value, second time value).

Otherwise, at 776, if first condition AND second condition is logically true, the next peak in the channel impulse response is found and the corresponding time is used as the time of arrival (ToA).

Figure 8:
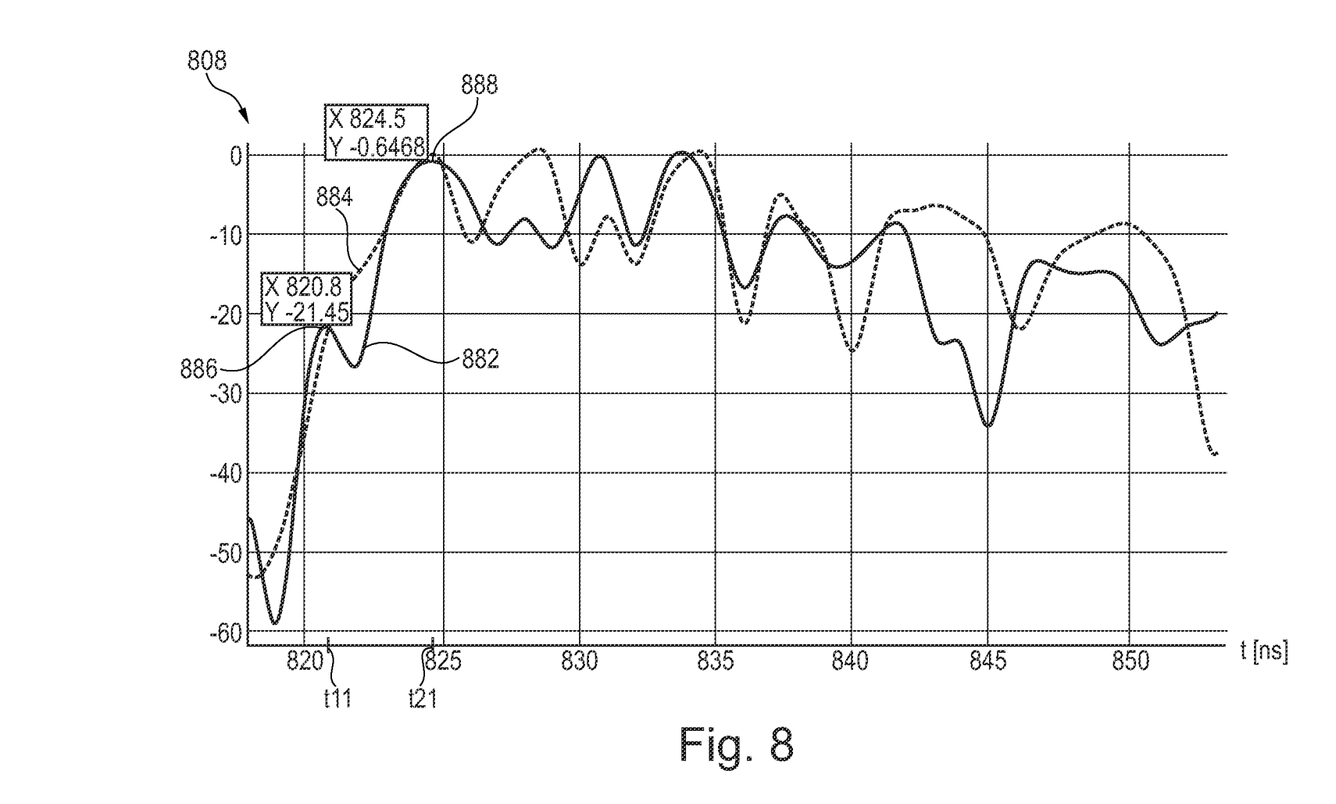
FIG. 8 shows a plot of channel impulse responses evaluated in accordance with the method shown in FIG. 7.

FIG. 8 shows a plot 808 of channel impulse responses evaluated in accordance with the method shown in FIG. 7 and discussed above. The plot 808 shows a first channel impulse response 882 obtained via the first antenna 612 and a second channel impulse response 884 obtained via the second antenna 614. The first channel impulse response 882 has a first peak 886 at time t11=820.8 ns while the second channel impulse response has a first peak 888 at time t21=824.5 ns. The absolute difference between t11 and t21 is 3.7 ns, i.e., above the typical threshold value of 1 ns applied in step 773 of the method 770 shown in FIG. 7 and discussed above. Thus, the method 770 continues to step 774 and analyses the first channel impulse response 882 in order to determine whether t11 as a candidate time value can be used as the time of arrival (ToA). This analysis is performed as described above.

It should be noted that the above-described principles of the present disclosure are equally applicable to UWB devices and systems comprising more than two antennas in combination with one or more receivers and switches. In general, the following considerations apply regarding the number of antennas and receivers:

number of antennas=number of receivers (RX):
Connect each antenna to an RX and receive the CIR simultaneously. It doesn't matter which frame format from IEEE 802.15.4z 2020 Table 15-a is used.

number of antennas—number of RX=1: (e.g., 1 RX and 2 antennas)
Connect the antennas via a single-input-dual-output RF switch to the RX and use a frame with STS
1. Set the switch to antenna1 to receive the preamble and SFD and calculate the CIR based on this
2. Set the switch to antenna2 right after the SFD, receive the STS with antenna2 and calculate the CIR based on this With this approach, the device receives two CIRs from two antennas with one RX using only a single frame (single shot). But it can be generalized also for more antennas. E.g. for three antennas and two RX, one combo can be directly connected together and the RF switch with the remaining antennas is connected to RX2. For secure applications a segmented STS frame according to FIG. 15-7a in IEEE 802.15.4z 2020 could be used. This means antenna1 receives STS1 and antenna2 receives STS2 while the preamble is not used.

number of antennas—number of RX>1: (e.g., 1 RX and 3 antennas)
Connect the antennas via single-input-triple-output RF switch to the RX and use a frame with segmented STS:
1. Set the switch to antenna1 to receive the preamble and SFD and calculate the CIR based on this
2. Set the switch to antenna2 right after the SFD, receive STS1 with antenna2 and calculate the CIR based on this
3. Set the switch to antenna3 right after the STS1, receive STS2 with antenna3 and calculate the CIR based on this By using one frame with segmented STS, a single RX device can receive the CIRs of 3 antennas. Again, this can be generalized for a higher number of antennas and RX. For secure applications, the same applies as for the above case where the preamble is not used but antenna1 starts with STS1 for the CIR.

It is noted that, unless otherwise indicated, the use of terms such as "upper", "lower", "left", and "right" refers solely to the orientation of the corresponding drawing.

It is noted that the term "comprising" does not exclude other elements or steps and that the use of the articles "a" or "an" does not exclude a plurality. Also, elements described in association with different embodiments may be combined. It should also be noted that reference signs in the claims should not be construed as limiting the scope of the claims.

The invention claimed is:

1. A method of determining a time of arrival of a signal at an UWB ranging device comprising a first antenna, the signal being transmitted by another UWB ranging device, the method comprising:
   determining a first channel impulse response based on at least a part of the signal received at the first antenna;
   determining a first time value as an earliest point in time at which the amplitude of the first channel impulse response exhibits a peak value;
   setting a candidate time value to the first time value;
   determining a first upper value as the amplitude of the first channel impulse response at a time value corresponding to the candidate time value plus a predetermined upper time value;
   determining a second upper value as the peak value plus a predetermined upper amplitude value;
   determining a first lower value as the amplitude of the first channel impulse response at a time value corresponding to the candidate time value minus a predetermined lower time value;
   determining a second lower value as the peak value minus a predetermined lower amplitude value;
   determining, as a first condition, whether the first upper value is larger than the second upper value;
   determining, as a second condition, whether the first lower value is smaller than the second lower value; and
   if at least one of the first condition and the second condition is not fulfilled, setting the time of arrival to the candidate time value.

2. The method according to claim 1, further comprising:
   if both the first condition and the second condition are fulfilled, determining a subsequent point in time at which the amplitude of the first channel impulse response exhibits another peak value, and setting the time of arrival to the subsequent point in time.

3. The method according to claim 1, wherein the UWB ranging device comprises a first antenna and a second antenna, the method further comprising:
- determining a second channel impulse response based on at least a part of the signal received at the second antenna;
- determining a second time value as an earliest point in time at which the amplitude of the second channel impulse response exhibits a peak value; and
- setting the candidate time value to the smallest of the first time value and the second time value,
- wherein determining each of the first upper value, the second upper value, the first lower value, and the second lower value is based on the one of the first channel impulse response and the second channel impulse response that corresponds to the candidate time value.

4. The method according to claim 3, further comprising:
- comparing an absolute difference between the first time value and the second time value with a predetermined threshold value; and
- if the absolute difference does not exceed the predetermined threshold value, setting the time of arrival to the smallest of the first time value and the second time value.

5. The method according to claim 4, wherein the UWB ranging device comprises a receiver and a switch, the switch being configured to selectively connect the receiver to one of the first antenna and the second antenna, the method further comprising:
- operating the switch to connect the receiver to the first antenna;
- receiving a first part of the signal at the receiver via the first antenna;
- operating the switch to connect the receiver to the second antenna; and
- receiving a second part of the signal at the receiver via the second antenna;
- wherein the first channel impulse response is determined based on the first part of the signal received at the receiver, and
- wherein the second channel impulse response is determined based on the second part of the signal received at the receiver.

6. The method according to claim 3, wherein the UWB ranging device comprises a receiver and a switch, the switch being configured to selectively connect the receiver to one of the first antenna and the second antenna, the method further comprising:
- operating the switch to connect the receiver to the first antenna;
- receiving a first part of the signal at the receiver via the first antenna;
- operating the switch to connect the receiver to the second antenna; and
- receiving a second part of the signal at the receiver via the second antenna;
- wherein the first channel impulse response is determined based on the first part of the signal received at the receiver, and
- wherein the second channel impulse response is determined based on the second part of the signal received at the receiver.

7. The method according to claim 3, wherein the UWB ranging device further comprises a third antenna, the method further comprising:
- determining a third channel impulse response based on at least a part of the signal received at the third antenna;
- determining a third time value as an earliest point in time at which the amplitude of the third channel impulse response exhibits a peak value; and
- setting the candidate time value to the smallest of the first time value, the second time value, and the third time value,
- wherein determining each of the first upper value, the second upper value, the first lower value, and the second lower value is based on the one of the first channel impulse response, second channel impulse, and third channel impulse response that corresponds to the candidate time value.

8. The method according to claim 7, further comprising:
- comparing an absolute difference between the two smallest of the first time value, the second time value, and the third time value with a predetermined threshold value; and
- if the absolute difference does not exceed the predetermined threshold value, setting the time of arrival to the smallest of the first time value, the second time value and the third time value.

9. An UWB ranging device comprising:
- a first antenna configured to receive a signal transmitted by another UWB ranging device; and
- a processing unit configured to:
  - determine a first channel impulse response based on at least a part of the signal received at the first antenna;
  - determine a first time value as an earliest point in time at which the amplitude of the first channel impulse response exhibits a peak value;
  - set a candidate time value to the first time value;
  - determine a first upper value as the amplitude of the first channel impulse response at a time value corresponding to the candidate time value plus a predetermined upper time value;
  - determine a second upper value as the peak value plus a predetermined upper amplitude value;
  - determine a first lower value as the amplitude of the first channel impulse response at a time value corresponding to the candidate time value minus a predetermined lower time value;
  - determine a second lower value as the peak value minus a predetermined lower amplitude value;
  - determine, as a first condition, whether the first upper value is larger than the second upper value;
  - determine, as a second condition, whether the first lower value is smaller than the second lower value; and
  - if at least one of the first condition and the second condition is not fulfilled, set the time of arrival to the candidate time value.

10. The device according to claim 9, further comprising a second antenna configured to receive the signal transmitted by the other UWB ranging device, wherein the processing unit is further configured to:
- determine a second channel impulse response based on at least a part of the signal received at the second antenna;
- determine a second time value as an earliest point in time at which the amplitude of the second channel impulse response exhibits a peak value; and
- set the candidate time value to the smallest of the first time value and the second time value,
- wherein determining each of the first upper value, the second upper value, the first lower value, and the second lower value is based on the one of the first channel impulse response and the second channel impulse response that corresponds to the candidate time value.

11. The device according to claim 10, wherein the processing unit is further configured to:
compare an absolute difference between the first time value and the second time value with a predetermined threshold value; and
if the absolute difference does not exceed the predetermined threshold value, set the time of arrival to the smallest of the first time value and the second time value.

12. The device according to claim 11, further comprising:
a receiver; and
a switch configured to selectively connect the receiver to one of the first antenna and the second antenna,
wherein the processing unit is further configured to:
operate the switch to connect the receiver to the first antenna;
receive a first part of the signal at the receiver via the first antenna;
operate the switch to connect the receiver to the second antenna; and
receive a second part of the signal at the receiver via the second antenna;
wherein the first channel impulse response is determined based on the first part of the signal received at the receiver, and
wherein the second channel impulse response is determined based on the second part of the signal received at the receiver.

13. The device according to claim 11, further comprising:
a first receiver coupled to the first antenna and configured to receive the signal via the first antenna; and
a second receiver coupled to the second antenna and configured to receive the signal via the second antenna,
wherein the processing unit is configured to:
determine the first channel impulse response based on the signal received at the first receiver, and
determine the second channel impulse response based on the signal received at the second receiver.

14. An UWB ranging system, the system comprising:
a first UWB ranging device according to claim 11; and
a second UWB ranging device configured to send a signal to the first UWB ranging device.

15. The device according to claim 10, further comprising:
a receiver; and
a switch configured to selectively connect the receiver to one of the first antenna and the second antenna,
wherein the processing unit is further configured to:
operate the switch to connect the receiver to the first antenna;
receive a first part of the signal at the receiver via the first antenna;
operate the switch to connect the receiver to the second antenna; and
receive a second part of the signal at the receiver via the second antenna;
wherein the first channel impulse response is determined based on the first part of the signal received at the receiver, and
wherein the second channel impulse response is determined based on the second part of the signal received at the receiver.

16. The device according to claim 10, further comprising:
a first receiver coupled to the first antenna and configured to receive the signal via the first antenna; and
a second receiver coupled to the second antenna and configured to receive the signal via the second antenna,
wherein the processing unit is configured to:
determine the first channel impulse response based on the signal received at the first receiver, and
determine the second channel impulse response based on the signal received at the second receiver.

17. The device according to claim 10, further comprising a third antenna, wherein the processing unit is further configured to:
determine a third channel impulse response based on at least a part of the signal received at the third antenna;
determine a third time value as an earliest point in time at which the amplitude of the third channel impulse response exhibits a peak value; and
set the candidate time value to the smallest of the first time value, the second time value, and the third time value,
wherein determining each of the first upper value, the second upper value, the first lower value, and the second lower value is based on the one of the first channel impulse response, second channel impulse, and third channel impulse response that corresponds to the candidate time value.

18. The device according to claim 17, further comprising:
a receiver; and
a switch configured to selectively connect the receiver to one of the first antenna, the second antenna, and the third antenna,
wherein the processing unit is further configured to:
operate the switch to connect the receiver to the first antenna;
receive a first part of the signal at the receiver via the first antenna;
operate the switch to connect the receiver to the second antenna;
receive a second part of the signal at the receiver via the second antenna;
operate the switch to connect the receiver to the third antenna;
receive a third part of the signal at the receiver via the third antenna;
wherein the first channel impulse response is determined based on the first part of the signal received at the receiver,
wherein the second channel impulse response is determined based on the second part of the signal received at the receiver, and
wherein the third channel impulse response is determined based on the third part of the signal received at the receiver.

19. An UWB ranging system, the system comprising:
a first UWB ranging device according to claim 10; and
a second UWB ranging device configured to send a signal to the first UWB ranging device.

20. An UWB ranging system, the system comprising:
a first UWB ranging device according to claim 9; and
a second UWB ranging device configured to send a signal to the first UWB ranging device.

* * * * *